United States Patent [19]
Blaschke et al.

[11] Patent Number: 5,936,377
[45] Date of Patent: Aug. 10, 1999

[54] METHOD AND APPARATUS FOR CORRECTION OF THE FLUX DIRECTION OF THE MODELLED FLUX IN A FIELD-ORIENTED ROTATING FIELD-MACHINE WITHOUT ANY SENSORS, DOWN TO ZERO FREQUENCY

[75] Inventors: Felix Blaschke, Bad Vöslau, Austria; André Jean Adolf Vandenput, Hasselt, Belgium

[73] Assignee: Siemens Aktiengesellschaft, Munich, Germany

[21] Appl. No.: 09/029,375
[22] PCT Filed: Aug. 21, 1996
[86] PCT No.: PCT/EP96/03688
§ 371 Date: Jun. 30, 1998
§ 102(e) Date: Jun. 30, 1998
[87] PCT Pub. No.: WO97/08820
PCT Pub. Date: Mar. 6, 1997

[30] Foreign Application Priority Data

Aug. 31, 1995 [DE] Germany .................. 195 32 149

[51] Int. Cl.$^6$ ........................................ H02P 7/00
[52] U.S. Cl. ........................ 318/807; 364/474.35
[58] Field of Search ..................... 318/798–815, 318/599, 685, 696, 254, 439; 364/474.12, 474.15, 474.18, 474.35

[56] References Cited

U.S. PATENT DOCUMENTS

| | | | |
|---|---|---|---|
| 4,441,065 | 4/1984 | Bayer et al. | 318/808 |
| 4,593,240 | 6/1986 | Blaschke | 318/800 |
| 4,629,961 | 12/1986 | Blaschke | 318/803 |
| 4,763,058 | 8/1988 | Heining et al. | 318/807 |
| 5,532,570 | 7/1996 | Tajima et al. | 318/809 |
| 5,659,234 | 8/1997 | Cresens | 318/696 |
| 5,850,132 | 12/1998 | Garces | 318/599 |

FOREIGN PATENT DOCUMENTS

| | | |
|---|---|---|
| 0 071 847 B1 | 2/1983 | European Pat. Off. |
| 0 161 616 A2 | 11/1985 | European Pat. Off. |
| 0 228 535 A1 | 7/1987 | European Pat. Off. |
| 41 03 270 C2 | 5/1992 | Germany |
| 44 13 809 A1 | 11/1994 | Germany |
| WO 92/19038 | 10/1992 | WIPO |

OTHER PUBLICATIONS

Jansen et al., "Transducerless Position and Velocity Estimation . . . ", IEEE Trans. On Ind. Appl. 31 (1995), Mar./Apr., No. 2, pp. 240–247.

Profumo et al., "Universal Field Oriented Controller . . . " IEEE Trans. On Ind. Appl., vol. 30, No. 2, Mar./Apr. 1994, pp. 448–455.

Matsuo et al., "A Rotor Parameter Identification Scheme . . . " IEEE Trans. On Ind. Appl., vol. IA–21 May/Jun., 1985.

*Primary Examiner*—Jonathan Salata
*Attorney, Agent, or Firm*—Kenyon & Kenyon

[57] ABSTRACT

A method for correcting of the flux direction of a modelled flux vector down to zero frequency. The modelled flux vector is formed by a machine model as a function of a stator current vector and a stator voltage vector of a rotating-filed machine that has no sensors. A nominal (command) value for the field-forming (field-producing) and torque-forming current (torque-producing) component of the stator current vector of the rotating-field machine is determined. A current test vector is then added to the nominal (command) value of the field-forming (field-producing) current component. The current test vector has a profile that is non-constant with respect to time. The rotating-filed machine is driven into the saturation region, and the determined voltage vector of the rotating-filed machine is used to recover the response information of the rotor current vector, to which the test movement of the stator current vector is transferred. Thus, the inaccuracy of the so-called voltage model at low frequencies is corrected down to zero frequency, without interfering with the rotating filed machine.

10 Claims, 13 Drawing Sheets

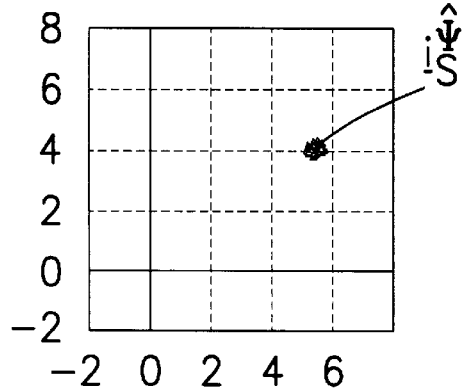
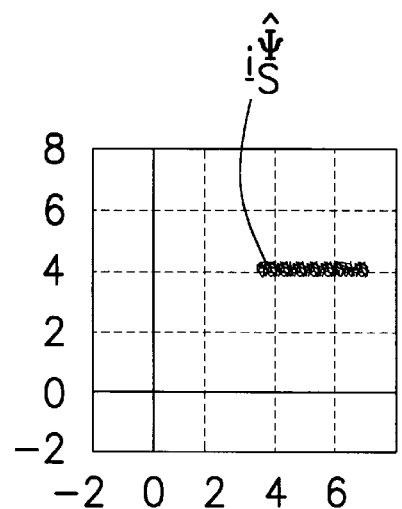
FIG. 15A        FIG. 15B
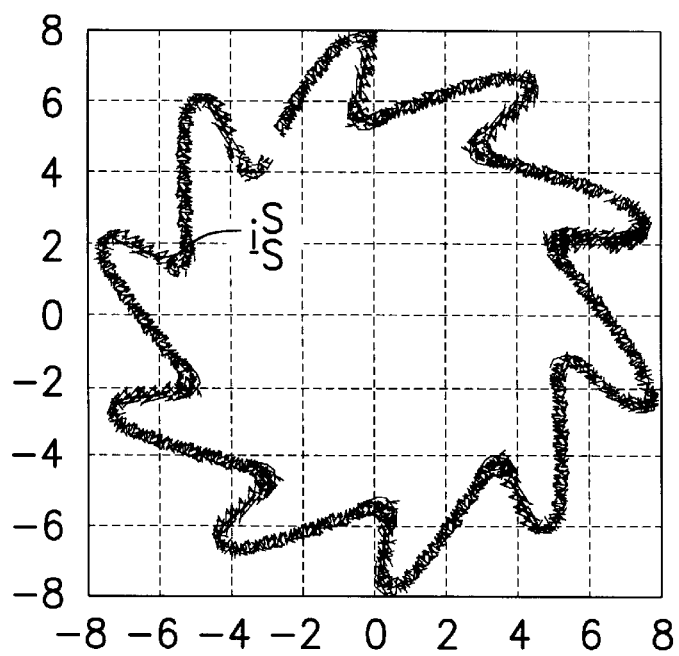
FIG. 16

METHOD AND APPARATUS FOR CORRECTION OF THE FLUX DIRECTION OF THE MODELLED FLUX IN A FIELD-ORIENTED ROTATING FIELD-MACHINE WITHOUT ANY SENSORS, DOWN TO ZERO FREQUENCY

FIELD OF THE INVENTION

The present invention relates to a method and apparatus for correcting the flux direction of a model flux vector down to zero frequency.

BACKGROUND INFORMATION

In order to regulate or control a rotating-field machine, it is advantageous to control the stator current as a function of the respective direction of the magnetic flux passing through the machine. As a result, the component of the machine current that is parallel to the flux is used to set the desired field strength, and the component of the machine current at right angles (i.e. perpendicular) to the flux is used to set the torque or the speed. Such field-oriented operation of the rotating-field machine thus requires a control element for the stator current and a control device which is connected upstream of the stator current control element. The control device receives information about the direction of the flux. This information may be supplied from a machine model which, as an electrical model of the rotating-field machine, uses operating data to determine the flux direction of a simulated modelled flux. If in each case one nominal (i.e. command) value for the field-forming (field-producing) component (parallel to the flux) and for the torque-forming (field-producing) component (perpendicular to the flux) of the machine stator current is now predetermined (field-oriented command values), then the control device can regulate or control the machine current to a stator-oriented stator current vector composed of the two command values with respect to the flux direction of the modelled flux.

In order to execute the control algorithms for dynamically high-quality, (i.e., high performance) field-oriented control concepts with an asynchronous machine running at low speeds, a mechanical sensor is required in order to detect the rotor position or the rotor speed. Asynchronous machines can be operated dynamically and with high quality, without any position sensors or tachogenerators, when the speed is higher than a certain minimum value, so that, from the induced voltage, the magnetic flux can be calculated from electrical variables. Until now, it has not been possible to do this in the low speed range. The aim of many research activities has therefore been to replace the mechanical sensor by mathematical models and/or by using physical effects.

In a field-oriented asynchronous machine without any sensors, the "voltage model" (which uses the machine current and stator voltage of the asynchronous machine as state variables to calculate the magnitude and phase of the magnetic flux in this machine) is used as a machine model. The voltage model calculates the flux as an integral of the electromotive force, that is, as an integral of the voltage less the resistive and inductive voltage drops in the stator. However, the voltage model gives an inaccurate signal at low speeds: errors in the estimated stator resistance, DC voltage components which occur as measurement errors in the voltage measurements, and integration errors in the technical integrators lead to incorrect calculations. Consequently, field-oriented operation that uses a voltage model is only possible at relatively high frequencies. In addition, for the electromotive force integrators, the integration constant must be set by predetermining an initial value.

In some cases, the axis of the electromotive force vector may be used as a direction vector instead of the flux direction, this axis being rotated over 90° electric from the field axis in the steady state. Although this allows the integration to be avoided, accurately controlled operation is not possible in this case at low frequencies. Instead of this, another option for detecting the direction vector is required.

A "current model" simulates the processes in the rotor which lead to the formation of the flux from instantaneous values of the current and rotor position. However, to do this a mechanical sensor is required to determine the rotor position. This complexity is admittedly reduced by an incremental rotation sensor or some other sensor that is not position-coded, such as a pure speed measuring device, but the rotor axis must then be detected (located) in some other way when the machine is stationary (stand-still) or running slowly. This location process is often complex, even with position-coded mechanical sensors.

The problem of locating the rotor position thus occurs particularly in the case of rotating-field machines which have pronounced preferred directions in the rotor, such as reluctance machines. This problem can be solved in the case of machines which have their own field winding since this field winding is still energized when it is stationary, (stand-still) and the resulting flux, which then points in the direction of the rotor axis, is calculated from the voltage induced in the stator. However, this option is impossible with permanent magnet excitation and, furthermore, does not overcome the difficulties that occur at low speeds.

For field-oriented operation of asynchronous machines and at low speeds, the voltage model for determining the position of the flux fails, and the current model has the same problems related to finding the rotor position. A complex mechanical sensor thus often appears to be necessary here as well.

International Patent Application WO 92/19038 describes in detail a number of solutions for the problem of finding the rotor flux position in asynchronous machines, synchronous machines, and reluctance machines. These solutions consist of the rotating-field machine being magnetized in its configuration as an asynchronous machine before the start of the measurement and of the reaction of measurement signals taken from the asynchronous machine being measured. The measurement signals are voltage jumps which are generated by the converter and cause current changes which are measured and fed to a computer which determines a complex characteristic variable which is proportional to the quotient of the stator voltage space vector and the time derivative of the stator current space vector. The direction of the voltage space vector is obtained from the known converter drive state, which is designated as a complex characteristic variable in the following text. The magnetic flux is calculated, both the real part and the imaginary part of the complex characteristic variable fluctuating virtually sinusoidally at twice the value of the magnetic flux angle, and the real part and imaginary part are used to determine twice the value of the sought magnetic flux angle using known complex calculation methods.

In this method, no mechanical sensor is required and the method is insensitive to uncertainties in the rotor resistance parameter, it being possible to dispense with voltage measurements. In addition, the supplying converter, which is present anyway, is used as a measurement signal generator.

International Patent Application WO92/19038 refers to the dissertation "Die permanenterregte umrichtergespeiste Synchronmaschine ohne Polradgeber als drehzahlgeregelter Antrieb," translated as "The permanently excited, convertor-fed synchronous machine without any rotor sensor as a regulated-speed drive", by H. Vogelmann (Karlsruhe University, Germany, 1986), which relates to a method for locating the rotor position. In this method, a relatively high-frequency current produced by means of a converter is superimposed as a test signal on the actual wanted signal. The basic idea in this case is that an electrical alternating signal which is locked in a certain (space vector) direction in general also causes a reaction in the orthogonal direction due to the different inductances in the longitudinal (direct) axis and transverse (quadrature) axis. Such a coupling is absent only when the alternating signal is applied exactly in the rotor longitudinal (direct) or transverse (quadrature) direction. A criterion results in this case as to whether the signal has or has not been applied in the desired particular direction. One precondition for achieving exact measurement results is a synchronous machine with permanent-magnet excitation and having a salient pole character, that is to say with unequal inductances in the longitudinal (direct) direction and transverse (quadrature) direction, as in the case of flux-concentrated arrangements, for example.

European Published Patent Application EP 0 228 535 A1 discloses a method and an apparatus for determining the flux angle in a rotating-field machine or for position-oriented operation of the machine. According to this method, a high-frequency element component is impressed on an electrical state variable of the stator winding system. In this case, the electrical state variables of the stator winding system are regarded as the currents and voltages in the individual stator coils, and the axes of the coils on which the high-frequency element (component) is impressed govern the direction of the impressed high-frequency element (component). It is self-evident that, for example, if a high-frequency current is impressed in one or more stator coils, high-frequency elements (components) also occur in the voltages of these coils and in the currents and voltages of the other coils. The voltage amplitude of these elements (components) depends on the angular difference between the flux axis and the direction of the impressed element. The amplitude of the high-frequency element (component) is thus determined from a state signal which reflects another state variable of the stator winding system; the sought angular direction is determined from the dependency of the detected amplitude on the predetermined direction of the impressed high-frequency part.

According to this method, a high-frequency element (component) must now be superimposed on the stator current by means of an additional nominal (command) vector whose frequency is higher than the frequency of the reference vector. The superimposition may be carried out by vector addition to the field-oriented nominal (command) vector or to the corresponding vector that is transferred to the stator-oriented coordinate system. Alternatively, the superimposition may be carried out in another, mathematically equivalent manner. As a result, the control vector also contains a correspondingly high-frequency element, which is impressed on the stator current via the converter. If the additional vector is a vector with a rapidly changing direction, then the control variable also changes correspondingly rapidly. The impression of a high-frequency element (component) in the stator current or in the stator voltage results in high-frequency voltage elements components (or current elements components) being coupled into the stator windings, whose envelope curves are associated with the position of the field axis or rotor axis. These envelope curves are associated, by suitable means, with the components of the direction vector. The direction vector is formed by means of a flux calculator which uses electrical machine variables to calculate the stator-related components of a model vector that describes the flux.

This method is based on the observation that a high-frequency element (component) of one state variable impressed in one of the stator coils induces a high-frequency element (component) in the other state variable of the same coil and high-frequency elements (components) in the state variables of the other coils. The high-frequency elements (components) depend on the position of the rotor or field axis. A sinusoidal oscillation at about 250 Hz is used as an additional nominal (command) vector. This method allows a synchronous machine to be operated in a field-oriented manner.

European Patent EP 0 071 847 B1 discloses a method and an apparatus for determining the rotor time constant of a field-oriented rotating-field machine. In this method, a disturbance variable whose profile is not constant with respect to time is added to the nominal (command) value of the field-forming (field-producing) component (parallel to the flux). The profile, with respect to time, of the actual value of an operating variable (torque or speed) is detected, and this operating variable is determined by the other component, that is, by the torque-forming (torque-producing) component of the machine current or the component of the machine current that exists perpendicular to the flux. This method further requires a correlation variable to be determined for correlation in the profile, with respect to time, of the disturbance variable and the detected operating variable. The parameter entered for the rotor time constant is varied as a function of the correlation variable until the correlation variable becomes virtually zero. The rotor acceleration or a rotating-field machine variable (torque or speed) derived from it is suitable for use as the operating variable to be detected. The disturbance variable preferably has a cyclic, statistical or pseudo-statistical profile with respect to time. This addition of a disturbance variable to the nominal (command) value for the field-forming (field-producing) current component has no effect on the torque-forming (torque-producing) component, provided the field orientation is exact. If the disturbance variable is chosen to have a profile with respect to time which differs sufficiently from the profile with respect to time of the nominal (command) current values (for example, the disturbance variable is provided with a profile that is at a considerably higher frequency), then the higher-frequency superimpositions caused by this can be associated unambiguously with the lack of decoupling of the flux and torque, that is, the incorrect setting of the rotor time constant. A sinusoidal signal is thus suitable for use as a disturbance variable.

SUMMARY OF THE INVENTION

The present invention relates to a method and apparatus for correcting the flux direction of a model flux vector down to zero frequency. The model flux vector is derived from a machine model as a function of two state vectors of a field-oriented rotating-field machine that does not include any sensors. According to the present invention, a nominal (command) value is predetermined for each field-forming (field-producing) and torque-forming (torque-producing) current component of the stator current vector of the rotating-field machine, and a current test signal that exhibits a non-constant profile with respect to time is added to the nominal value for the field-forming current component.

An object of the present invention is to provide a method and an apparatus for correcting, down to zero frequency, the flux direction of a modelled flux vector that is formed by means of a machine model as a function of two state vectors of a field-oriented rotating-field machine provided without any sensors.

In order to achieve this object, the present invention is directed to a method for correcting, down to zero frequency, a flux direction of a modelled flux vector that is formed by a machine model as a function of a stator current vector and a stator voltage vector of a field-oriented rotating-field machine that includes no sensors. In particular, the present invention determines a nominal (command) value for a field-forming (field-producing) current component of the stator current vector of the rotating-field machine. The present invention then determines a nominal (command) value for a torque-forming (torque-producing) current component of the stator current vector of the rotating-field machine, after which a current test signal is added to the nominal (command) value for the field-forming (field-producing) current component, wherein the current test signal exhibits a non-constant profile with respect to time. The present invention then raises the field-forming (field-producing) current component in order for the rotating-field machine to operate in a saturation region; a profile is then detected with respect to time of each voltage component of the stator voltage vector of the rotating-field machine. The present invention then converts the profile of each voltage component of the stator voltage into a corresponding flux-oriented voltage component. The present invention then derives from each flux-oriented voltage component a corresponding voltage component having a non-constant profile with respect to time and derives a variable from the current test signal. After doing so, the present invention determines at least a first component and a second component of a correlation vector from a profile with respect to time of the derived variable and from the profile with respect to time of each voltage component corresponding to each flux-oriented voltage component, wherein the first determined component represents a value of the correlation vector along a first axis, and wherein the second determined component is perpendicular to the first axis. Finally, the present invention adjusts the flux direction of the simulated modelled flux vector to the second determined component of the correlation vector until the second determined component of the correlation vector becomes zero.

The present invention is also directed to an apparatus for correcting, down to zero frequency, a flux direction of a modelled flux vector that is formed by a machine model as a function of a stator current vector and a stator voltage vector of a field-oriented rotating-field machine that includes no sensors. This apparatus includes a control element for a stator current of the rotating-field machine and a machine model having a plurality of inputs for receiving components of the stator current vector and components of the stator voltage vector. In this apparatus, a control device is in communication with the control element and with the machine model and has a plurality of inputs for receiving a nominal (command) value for a flux-forming (flux-producing) component of the stator current vector and a nominal (command) value for a torque-forming (torque-producing) component of the stator current vector. In communication with the control device are a generator for producing a current test signal having a non-constant profile with respect to time, a current raising device for raising the nominal (command) value of the flux-forming (flux-producing) current component of the stator current vector, and a device for producing voltage components, each voltage component having a non-constant profile with respect to time. A coordinate converter, which is in communication with the device for producing voltage components, is provided in this apparatus for receiving stator voltages of the rotating-field machine. The apparatus according to the present invention also includes a device, which is in communication with the device for producing voltage components, for forming a correlation vector having at least a first component arranged along a first axis and a second component that is perpendicular to the first axis. The device for forming the correlation vector has a first output for supplying the first component of the correlation vector and a second output for supplying the second component of the correlation vector, and the second output of the device for forming the correlation vector is connected via an adjusting means to the machine model.

The method is based on the effect that occurs in the region of magnetic saturation. The effect is based on the particular way in which stator current vector movements in this region are transferred to associated movements of the rotor current vector. The transfer characteristics may be derived from the equations for a current-fed asynchronous machine. These equations take into account saturation, into account and they are strictly in accordance with the rotating-field machine theory. A very simple relationship, which is illustrated in FIG. 1, follows from this for sufficiently fast and small movements of the stator current vector. This FIG. 1 shows how such "test movements" (distinguished by $\Delta$) of the stator current vector are transferred to the rotor current vector. The current vector $\Delta i_s^o$ predetermined in the stator coordinate system is transformed into the flux coordinate system by means of the vector rotator 2. This is done by the flux direction of the flux vector of the rotating-field machine being present at the angle input. The negative rotor current coordinates $-\Delta i_r^{\Psi 1}$ and $-\Delta i_r^{\Psi 2}$ are obtained from the coordinates $-\Delta i_s^{\Psi 1}$ and $-\Delta i_s^{\Psi 2}$ that occur in this case, via the factors $e_{11}$ and $e_{22}$. After reverse transformation to the stator coordinate system by means of a further vector rotator 4, the rotor current vector $\Delta i_r^s$ caused by $\Delta i_s^s$ is obtained. The described transfer takes place virtually without any time delay. The significant feature in this structure is the fact that the transformation factors $e_{11}$ and $e_{22}$ are of different magnitude in the saturated region, $e_{11}$ always being less than $e_{22}$ in this region. This means that the current transfer parallel to the rotor flux has less intensification gain than that perpendicular to it. As a result of this effect, it is in principle possible to identify the direction of the rotor flux.

The following text illustrates how the factors $e_{11}$ and $e_{22}$ depend on the saturation state of the machine. To this end, FIG. 2 shows the relationship between the p.u. variables of the airgap flux $\Psi_L$ and the magnetization current $i_{\mu L}$. Every operating point P is distinguished by two characteristic values: on the one hand by the angle $\alpha$ of the position vector, on the other hand by the angle $\beta$ of the tangent at the respective operating point P. The factors $e_{11}$ and $e_{22}$ are closely linked to these two angles.

$$e_{11} \approx \frac{1}{1 + l_{\sigma r} \frac{1}{tg\beta}} \quad (1)$$

-continued $$e_{22} \approx \frac{1}{1 + l_{\sigma r} \frac{1}{tg\alpha}} \quad (2)$$

Different transformation factors $e_{11}$ and $e_{22}$ thus always occur whenever $$tg\beta \neq tg\alpha \quad (3)$$

This is always the case in the saturated region. In addition to tgα and tgβ, the magnitude of the difference between the factors still depends on the stray leakage inductance $l_{\sigma r}$. The profile of $e_{11}$ and $e_{22}$ is plotted as a function of the degree (level) of saturation for a normal value of $l_{\sigma r}=0.1$ in FIG. 3. It can be seen that the difference is very clear even at the marked operating point P, namely $$e_{11} \approx 0.8$$
$$e_{22} \approx 0.95 \quad (4)$$

Since the method according to the present invention is intended to be feasible without any manufacturing interference in the rotating-field machine, the information relating to the rotor current vector is obtained from the stator voltage vector. This method produces a signal which provides clear information as to whether the estimated flux axis coincides with the true flux axis or is to the right or left of it. This signal is used to adjust the modelled flux vector until the signal becomes zero. The estimated flux axis now coincides precisely with the true flux axis. Since the voltage model is used as the machine model, the present invention is used only at low frequencies down to zero frequency in order to correct for the inaccuracy of the voltage model in this region. Above low frequencies, there is no correction to the flux position calculated from the voltage model.

BRIEF DESCRIPTION OF THE DRAWINGS

FIG. 15 shows the stator current vector in the rotor flux coordinate system when the machine is loaded in the saturation range with and without stator current test oscillation.

FIG. 16 shows the stator current vector with stator current test oscillation in the stator coordinate system.

DETAILED DESCRIPTION

Figure 4:
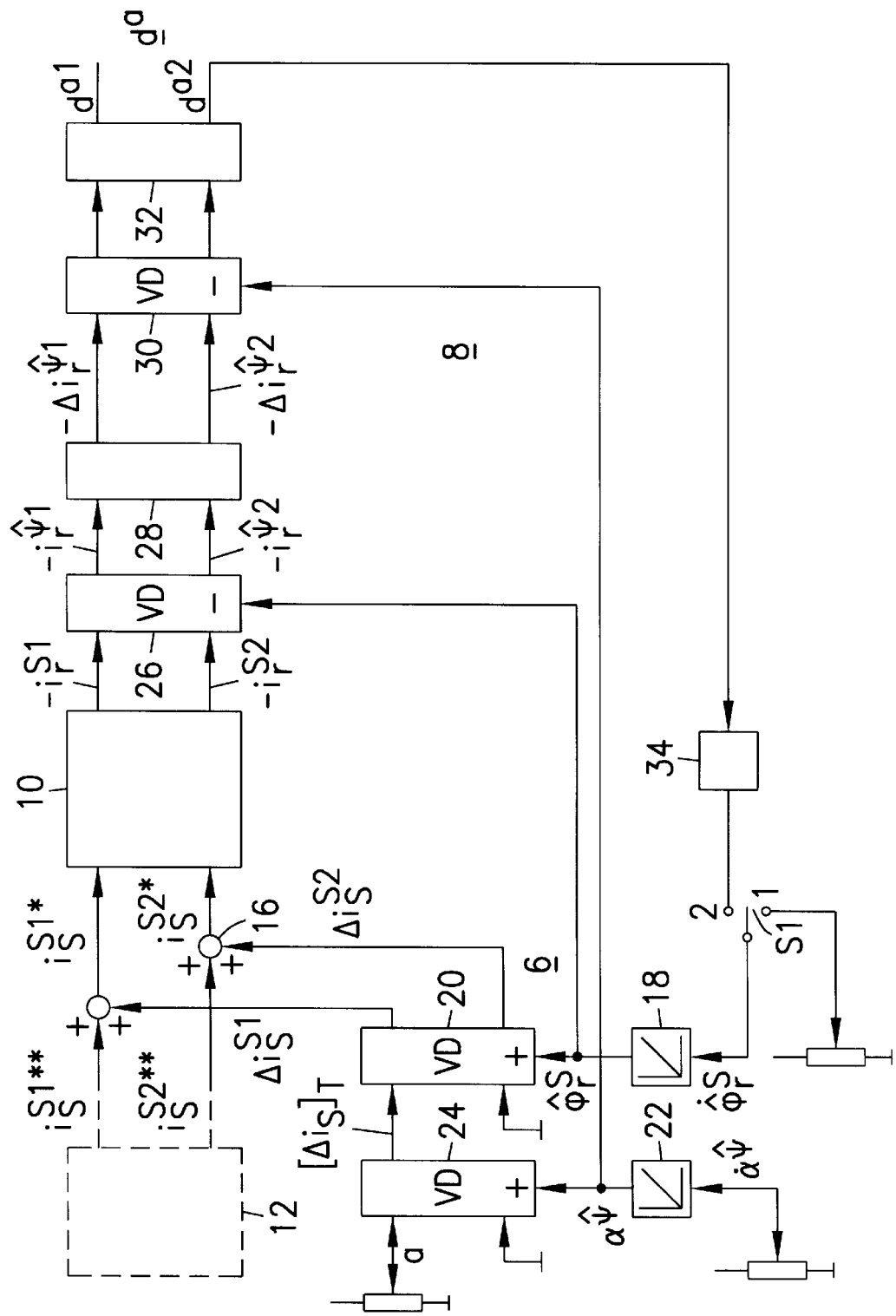
FIG. 4 shows a block diagram for the evaluation of the described saturation effect for flux angle determination.

One fundamental option for evaluation of the described saturation effect for flux angle determination is illustrated by a circuit arrangement according to FIG. 4. This circuit arrangement includes a presetting section 6 and an output section 8. A current-controlled rotating-field machine 10 is fed from a control device 12 of any desired design. This control device 12 produces nominal command values for the current component $s1_{is}$ and for a current component $s_s^{s1}$ which are respectively connected to one of addition elements 14 and 16. These current components $i_s^{S1}$ and $i_s^{S2}$ that are formed have a test current vector $\Delta i_s^{s*}$ additively superimposed on them. An estimated value of the rotor flux axis is used to produce this test current vector $\Delta i_s^{s*}$ this estimated value in this case being produced by an angle integrator 18 that is initially fed at a constant frequency (S1 in position 1). The vector rotator 20 has a first input that is supplied with current test signal $[\Delta i_s]_T$, which varies with time, and vector rotator 20 also has a second input that is supplied with the estimated angle value. The test current vector $\Delta i_s^{S*}$ used in this way carries only translational movements parallel to the estimated flux axis $\hat{\Phi}_r^S$. The current test signal $[\Delta i^s]^T$ is formed by a second angle integrator 22 and by a vector rotator 24. The angle integrator 22 is fed a constant test frequency $\dot{\alpha}^\Psi$, and the first input of the vector rotator 24 is fed a constant test amplitude a. This results in a current test signal as a cosine oscillation in the form $$[\Delta i_S]_T = a \cdot \cos\dot{\alpha}_t^\psi \quad (5)$$

Figure 5:
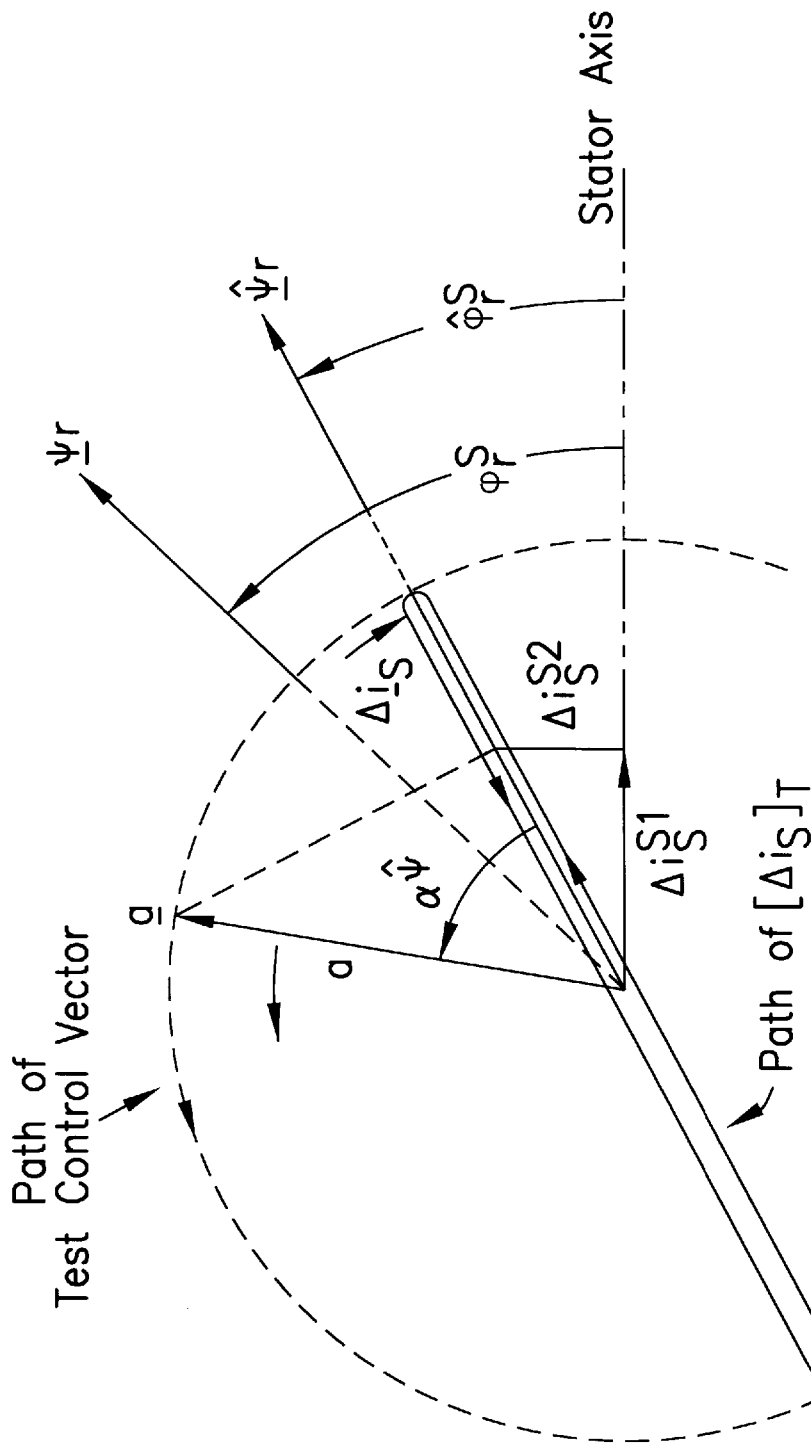
FIG. 5 illustrates a vector diagram that shows the formation of a current test signal.

FIG. 5 shows the described featured, combined in a vector diagram. The current test signal $[\Delta i_S]_T$ can be described as a projection (obtained from the test guide vector a rotating at the test frequency $\dot{\alpha}^\Psi$) to the estimated flux axis, which has the angle $\hat{\Phi}_r^S$ with respect to the stator axis. During one revolution of the test guide vector a, this projection passes over the path marked in bold; this results in the production of a test vector $\Delta i_S$ which pulsates translationally in the direction of the estimated flux axis $\hat{\Phi}_r^S$.

Figure 6:
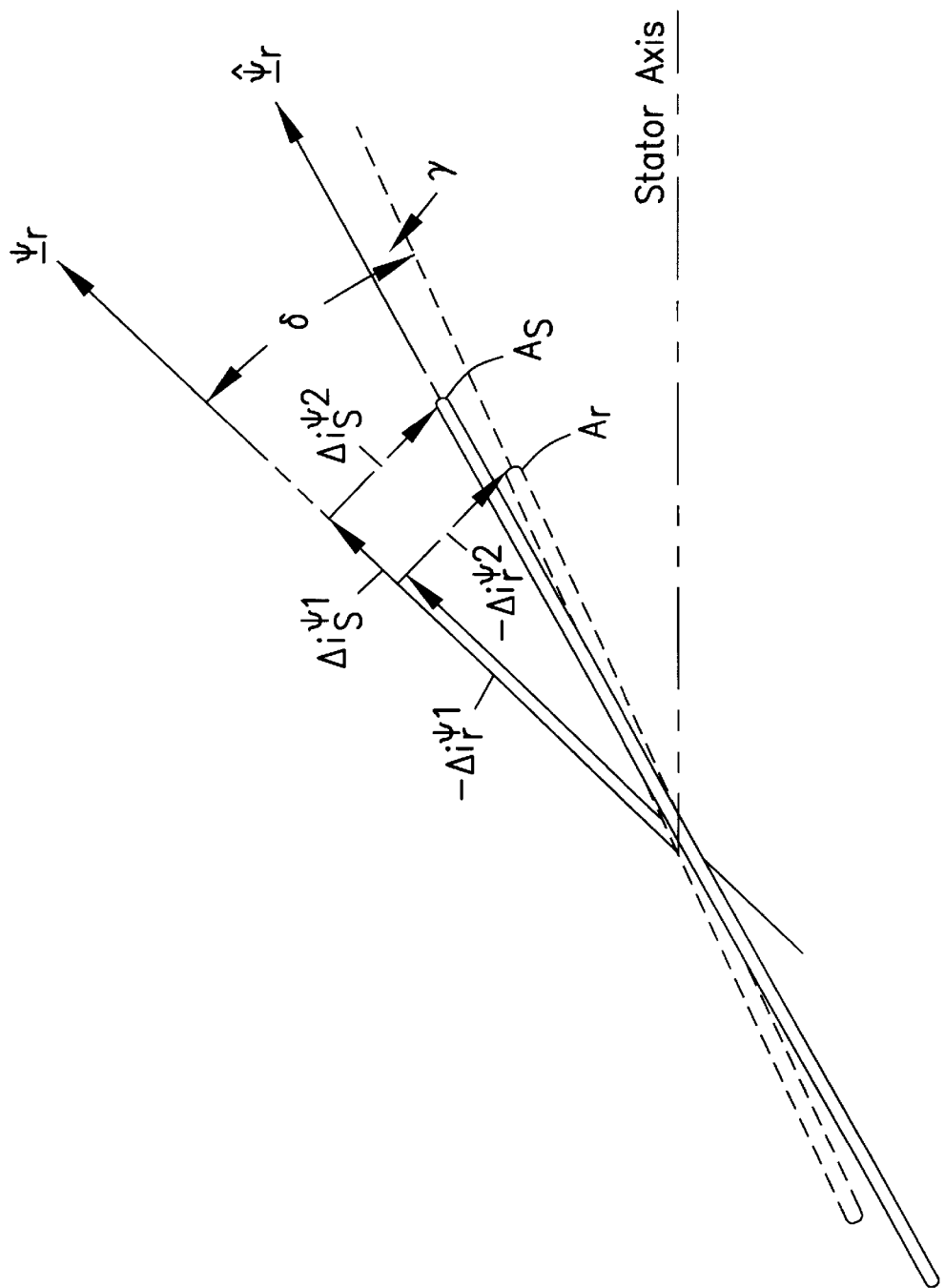
FIG. 6 illustrates a vector diagram that describes the path of the rotor current vector caused by the current test signal.

FIG. 6 shows the path described by the rotor current vector $-\Delta i_r$ caused by the test vector $\Delta i_S$. The initial point $A_S$ of such a test oscillation is used for this purpose. On the basis of the transformation procedure illustrated in FIG. 1, the field-oriented coordinates have to be formed from the test vector $\Delta i_S$, namely $\Delta i_S^{\Psi 1}$ and $\Delta i_S^{\Psi 2}$, and these must be multiplied by the transformation factors $e_{11}$ and $e_{22}$, respectively. The values from equation (4) give the coordinates of $-\Delta i_r^{\Psi 1}$, $-\Delta i_r^{\Psi 2}$, shown in FIG. 6, for the initial point $A_r$ of the rotor current oscillation. The overall oscillation path of the rotor current vector $-\Delta i_r$ is also obtained in this way and it is illustrated by the dashed bold lines.

As can be seen, the oscillation path of the rotor current vector $-\Delta i_r$ is rotated with respect to the oscillation path of the test vector $\Delta i_S$, which, to be precise, is over the angle $\gamma$. The rotation is caused by the fact that the field-oriented coordinates $\Delta i_S^{\Psi 1}$ and $\Delta i_S^{\Psi 2}$ of the test vector $\Delta i_S$ are shortened to different extents, and it is therefore a direct expression of the current transformation law for the saturated machine according to FIG. 1.

Figure 7:
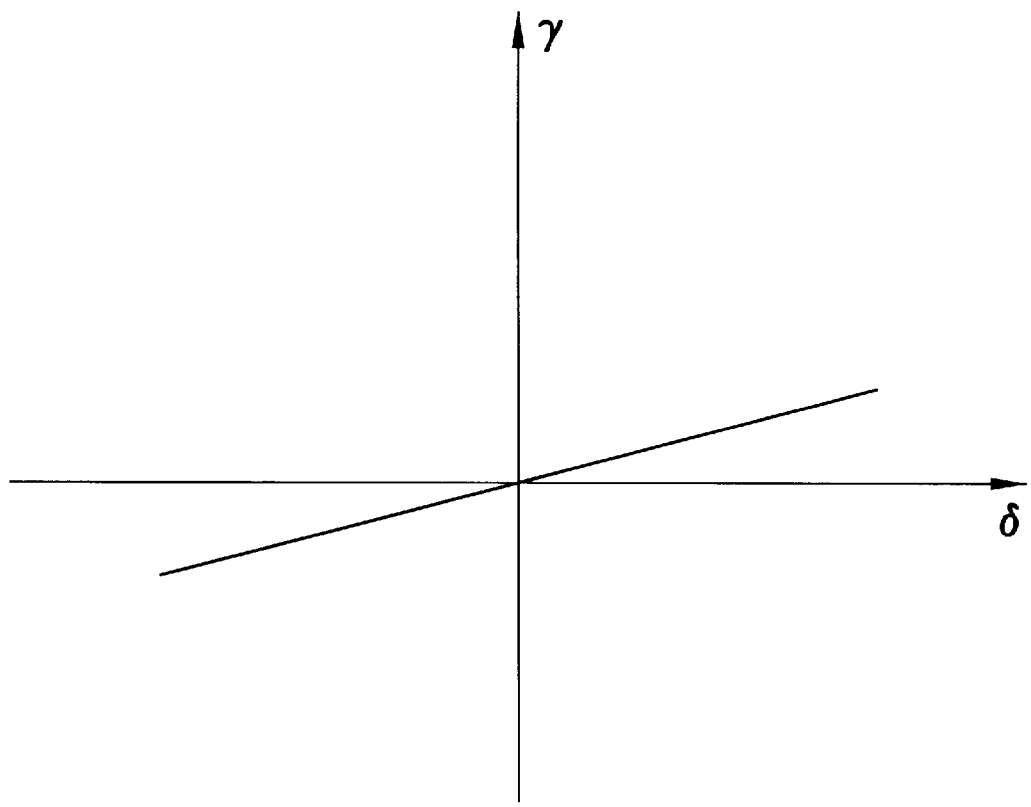
FIG. 7 shows this relationship between a rotation angle γ and the error between the estimated flux position and the true flux position.

With regard to this situation, the knowledge is now absolutely fundamental that the rotation angle $\gamma$ is dependent on the angle $\delta$ that the flux axis $\hat{\Phi}_r^S$ has with respect to the estimated flux axis $\hat{\Phi}_r^S$. It is easy to convince oneself that the rotation angle $\gamma$ always points in the opposite direction to $\delta$ and, furthermore, becomes zero when $\delta=0$; with the numbered arrows shown in FIG. 6, this gives the relationship illustrated in FIG. 7. The rotation angle $\gamma$ thus provides clear information as to whether the estimated flux axis $\hat{\Phi}_r^S$ coincides with the true flux axis $\Phi_r^S$ or is to the right or left of it.

Figure 8:
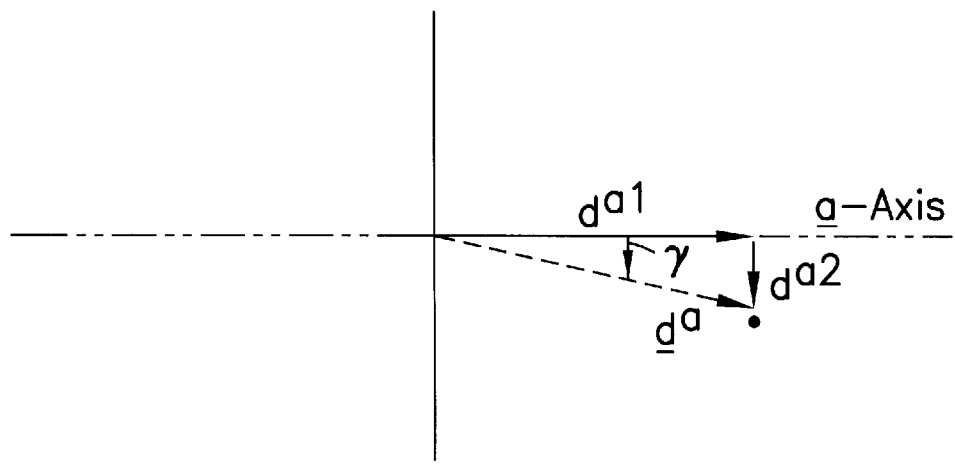
FIG. 8 shows the correlation vector in a coordinate system related to the test guide vector.

According to FIG. 4, the determination of this rotation angle $\gamma$ is illustrated in the evaluation section 8 on the circuit arrangement. The evaluation is carried out by performing the following steps: First, the components $-i_r^{S1}$ and $-i_r^{S2}$ of the stator-oriented vector $-\Delta i^S$ of the negative rotor current are measured in the stator coordinate system. This vector $-\Delta i^S$ is transformed by means of the vector rotator 26 into the coordinate system defined by the estimated flux axis $\hat{\Phi}_r^S$, thus providing the components $-i_r^{\Psi} 1$ and $-i_r^{\Psi} 2$ of the field-oriented vector $-i_r^{\Psi}$ of the negative rotor current in the coordinate system defined by the estimated flux axis $\hat{\Phi}_r^S$. A "raising filter" (or high-pass filter) 28 (whose phase is compensated with respect to the test frequency) is then used to prepare the test vector $-\Delta i_r^{\Psi}$, having the components $-\Delta i_r^{\Psi} 1$ and $-\Delta i_r^{\Psi} 2$, from the said signals $-i_r^{\Psi} 1$ and $-i_r^{\Psi} 2$. This vector, which pulsates at the frequency $\alpha^{\Psi}$ of the test guide vector a may be described by the sum of two vectors of constant length, the first of which rotates at $\dot{\alpha}^{\Psi}$ (positive-sequence system) and the second of which rotates at $-\dot{\alpha}^{\Psi}$ (negative-sequence system). The translational pulsating test vector $-\Delta i_r^{\Psi}$ is then used to determine the positive-sequence system by coordinate transformation into the axis $\alpha^{\Psi}$ of the test guide vector a by means of a vector rotator 30 and subsequent low-pass filtering by a low-pass filter 32. The vector $d^a$ obtained in this way (FIG. 8) represents a stationary variable (indicated by a dot in FIG. 8). It is now evident that this vector $d^a$ is rotated over the shift angle $\gamma$ with respect to the coordinate axis a (FIG. 8). The component $d^{a2}$ of the vector $d^a$ perpendicular to the axis is thus a measure of the angle $\gamma$; this important variable has thus been determined.

A control circuit 34, in which the signal thus obtained is used as an actual value and which acts on the input of the angle integrator 18 which produces the angle $\hat{\phi}_r^S$ (S1 in position 2), is now used to vary the estimated flux angle $\hat{\phi}_r^S$ until the rotation angle $\gamma$ has become equal to zero. $\hat{\phi}_r^S$ is thus adjusted to $\phi_r^S$ and thus, in the adapted state, is equal to the true flux angle, which means that, in principle, the problem of flux angle detection has been solved.

It is a special feature of the described method that the test movements of the stator current vector in the adapted state used in this case, that is to say as soon as the test axis has been found, run parallel to the rotor flux and thus have no influence on the electrical torque; the test process thus remains virtually invisible to the operator.

The basic form of the measurement method described so far does not yet, of course, represent the solution to the problem described initially because the vector of the rotor current must be measured in this case and this measurement is impossible without interference with the machine. However, the basic form of the measurement method should explain only the principle on which the method operates.

Figure 9:
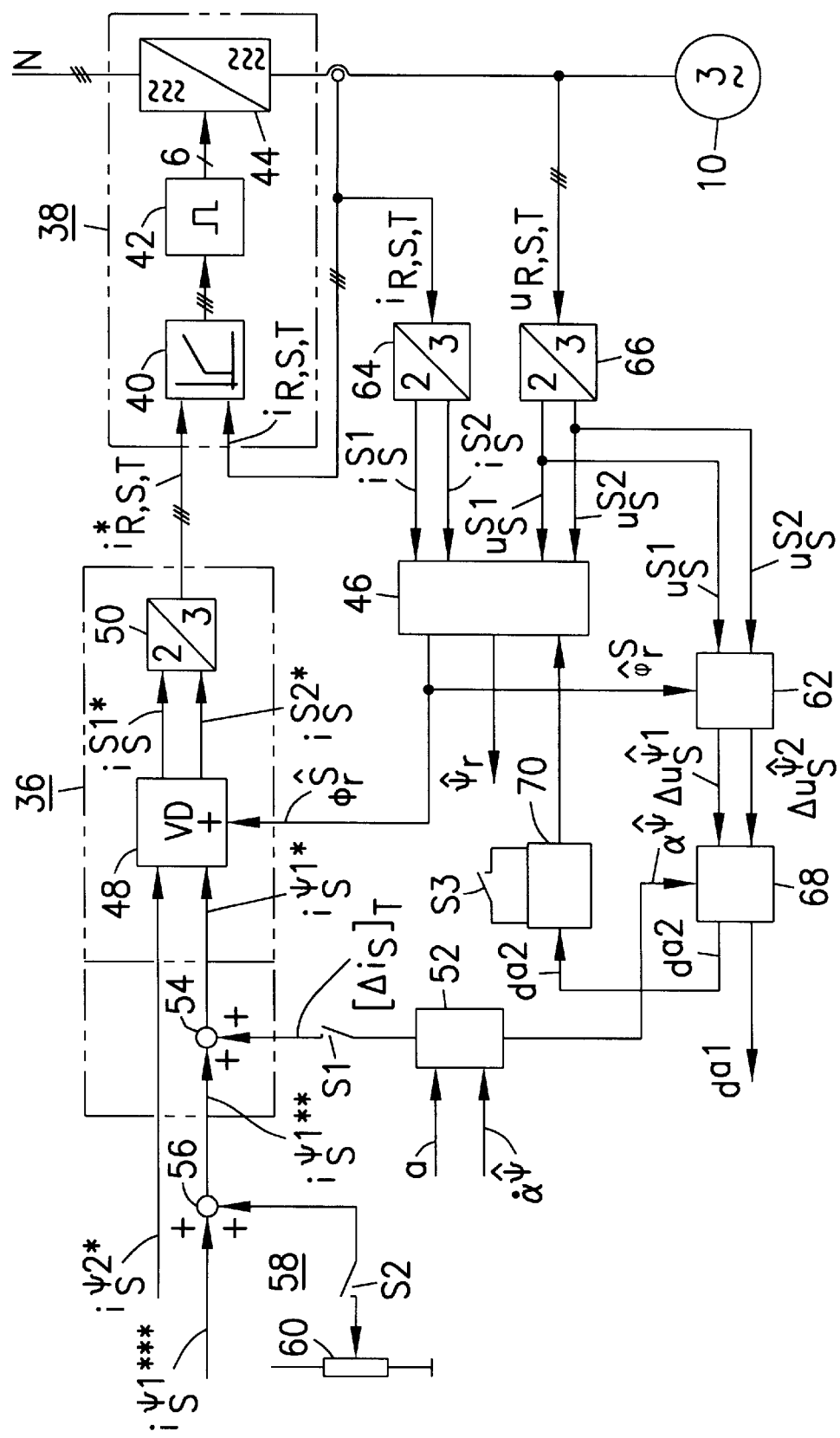
FIG. 9 shows a circuit diagram of an apparatus for carrying out the method according to the present invention.

In practice, the information, which is so important, about the rotor current vector is obtained from the stator voltage vector. A circuit diagram of an apparatus for carrying out the method according to the present invention is illustrated in more detail in FIG. 9. Let us assume that the rotating-field machine is an asynchronous machine 10. In order to control this asynchronous machine 10, a nominal (command) value $i_S^{\Psi 1}$ for the flux-forming (flux-producing) component of the stator current is preset at one input of a control device 36, and this nominal (command) value allows the flux in the rotating-field machine 10 to be kept constant. The nominal (command) value $o_S^{\Psi 2}$ for the stator current component perpendicular to the flux is preset at another input of this control device 36 and is formed, for example, by a superimposed speed regulator (controller) that is not illustrated in more detail. A control element devices 38 controls the current in the rotating-field machine 10. A current regulator (controller) 40 includes two inputs. For each phase of a three-phase rotating-field machine 10, nominal (command) values $i^*_{R,S,T}$ are supplied from a control device 36 to one input of current regulator 40. The other input of regulator 40 is supplied with actual values $i_{R,S,T}$ of the stator current. These actual values are obtained from an actual value line, as illustrated in FIG. 9. As a result of this arrangement, corresponding control voltages are formed and are then processed in a control element 42 to form corresponding trigger pulses for a converter 44, which is arranged between an AC power supply N and the rotating-field machine 10.

A machine model 46, in this case a "voltage model," calculates a modelled value of the simulated flux of the rotating-field machine as a function of the Cartesian components $i_S^{S1}$ and $i_S^{S2}$ of the stator current vector $i_S$ and as a function of the Cartesian components $u_S^{S1}$ and $u_S^{S2}$ of the stator voltage vector $u_S$. This flux may be calculated, for example, as a corresponding vector $\hat{\Psi}_r$ on the basis of its magnitude $\hat{\Psi}_r$ and an angle $\hat{\Phi}_r^S$, only the angle $\hat{\Phi}_r^S$ being required to carry out the method.

As illustrated in FIG. 9, the control device 36, which is connected upstream of the stator current control element (device) 38, supplies an input variable to current control element (device) 38. In order to form this input variable, control device 36 uses nominal values for the components $i_S^{\Psi 1}$ and $i_S^{\Psi 2}$ of the stator current as over well as the flux direction modelled value $\hat{\Phi}_r^S$; these nominal values are supplied as inputs to control device 36. Further, one of these values corresponds to a component that is parallel to the flux, and another of these values corresponds to a component that is perpendicular to the flux. A vector rotator 48, for example, may be provided to form the input variable for current control element (device) 38. Vector rotator 48 converts the components (which are predetermined in a field-oriented manner) of the nominal (command) stator current into stator-related, fixed-position coordinates $i_S^{S1*}$ and $i_S^{S2*}$; that is, vector rotator 48 carries out a rotation of the reference system over the entered flux direction modelled value $\hat{\Phi}_r^S$. A coordinate converter 50 uses the two stator-related Cartesian components $i_S^{S1*}$ and $i_S^{S2*}$, to form three nominal (command) values $i^*_{R,S,T}$ which, corresponding to the directions of the stator windings connected to the three converter outputs, give the stator current nominal (command) vector by vectorial addition.

The generator 52 produces a current test signal $[\Delta i_S]_T$ having a profile that is not constant with respect to time and which is superimposed on the nominal (command) value for the field-forming (field-producing) current component $i_S^{\Psi 1}$. This superimposition is carried out by means of an adder 54. The amplitude a and frequency $\alpha^\Psi$ are fed to the generator 52. A switch S1 is inserted in the connection from the addition element 54 to the generator 52**.

The nominal (command) value for the field-forming (field-producing) current component $i_S^{\Psi 1}$ is present at one output of a further addition element 56, to which a current raising apparatus 58 is connected. This current raising apparatus 58 has a device 60 for voltage division, for example a potentiometer 60, and a switch S2. This switch S2 allows an adjustable current value to be added to the nominal (command) value for the field-forming (field-producing) current component $i_S^{\Psi 1*}$, in such a manner that the rotating-field machine 10 is operated in the saturation region. When the switch S2 of the current raising apparatus 58 is closed, the switch S1 is likewise closed, such that the current test signal $[\Delta i_S]_T$ generated by the generator 52 can be added to the raised nominal (command) value of the field-forming (field-producing) current component $i_S^{\Psi 1**}$.

As already mentioned, a model value for the simulated flux $\hat{\Psi}_r$ of the rotating-field machine is calculated by the machine model 46, and this calculation is based on the determined state vector of the stator current $i_S$ and the determined control vector of the stator voltage $u_S$. The flux $\hat{\Psi}_r$ quoted as the corresponding vector $\hat{\Psi}_r$ on the basis of its magnitude $\hat{\Psi}_r$ and an angle $\hat{\Phi}_r^S$. This flux direction $\hat{\Phi}_r^S$ is fed on the one hand to the vector rotator 48 of the control device 36, and on the other hand to a device 62 for producing voltage components $\Delta u_s^{\Psi}1$ and $\Delta u_s^{\Psi}2$, which contain only more elements (components) whose profile is not constant with respect to time. In order to form the state vector of the stator current $i_S$ and the control vector of the stator voltage $u_S$, determined actual values of the phase currents $i_{R,S,T}$ and terminal voltages $u_{R,S,T}$ are respectively fed to a coordinate converter 64 and 66. These coordinate converters 64 and 66 each convert a three-phase system to an orthogonal two-phase system. The orthogonal voltage components $u_s^{S1}$ and $u_s^{S2}$ of the state vector $u_S$ are likewise fed to the device 62. An exemplary embodiment of the device 62 is illustrated in more detail in FIG. 10. The voltage components $\Delta u_s^{\Psi}1$ and $\Delta u_s^{\Psi}2$ are present at the outputs of this device 62 and contain only more elements whose profile is not constant with respect to time and which have been produced by the current test signal $[\Delta i_S]_T$. These voltage components $\Delta u_s^{\Psi}1$ and $\Delta u_s^{\Psi}2$ are fed to a device 68 for forming the components $d^{a1}$ and $d^{a2}$ of a correlation vector $d^a$. One output of this device 68, at which the component $d^{a2}$ at right angles to the axis is present, is connected via a adjusting means 70 to the machine model 46. The adjusting means 70 may be switched through (switched on) by means of a switch S3. One embodiment of the device 68 is illustrated in more detail in FIG. 11.

Figure 10:
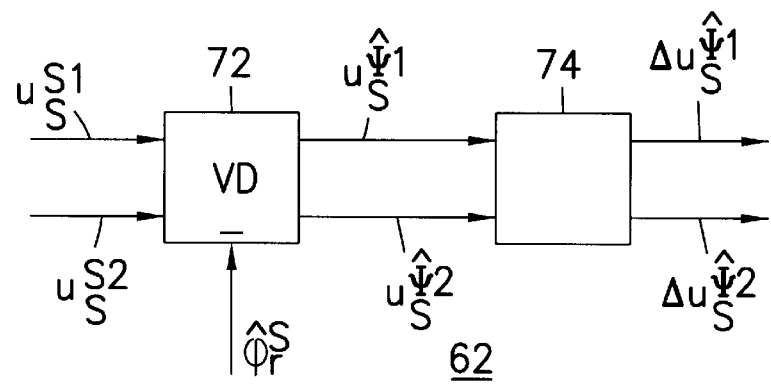
FIG. 10 shows one embodiment of the device of FIG. 9 for producing voltage components, whose profile is not constant with respect to time.

FIG. 10 shows one embodiment of the device 62 for producing voltage components $\Delta u_s^{\Psi}1$ and $\Delta u_s^{\Psi}2$ according to FIG. 9. This device 62 comprises a vector rotator 72 on the input side and a filter 74 on the output side. The two outputs of the vector rotator 72 are electrically linked to the two inputs of the filter 74. The orthogonal voltage components $u_s^{S1}$ and $u_s^{S2}$ of the state vector of the stator voltage $u_s$ of the rotating-field machine 10 are present at the inputs of the vector rotator 72 and are formed by means of the coordinate converter 66 from the actual values $u_{R,S,T}$ of the terminal voltage of the rotating-field machine 10. The estimated flux direction $\hat{\phi}_r^S$ r of the model value $\hat{\Psi}_r$ is present at the angle input of the vector rotator 72. The orthogonal, stator-oriented voltage components $u_s^{S1}$ and $u_s^{S2}$ are transformed into the flux-related coordinate system by means of the vector rotator 72, one orthogonal axis of which flux-related coordinate system coincides with the direction of the model value $\hat{\Psi}_r$ of the machine flux vector $\Psi_r$. This results in the field-oriented voltage components $u_s^{\Psi}1$ and $u_s^{\Psi}2$ which have a DC element and an AC element caused by the current test signal $[\Delta i_S]_T$. The field-oriented voltage components $u_s^{\Psi}1$ and $u_s^{\Psi}2$ are filtered in the correct phase by means of the filter 74, inter alia being raised (that is to say the DC element is removed), so that the voltage components $\Delta u_s^{\Psi}$ and $\Delta u_s^{\Psi}2$ are present at the outputs of the filter 74, these components only containing more components whose profile is not constant with respect to time; these are caused by the current test signal $[\Delta i_S]_T$. The voltage vector $\Delta u_s^{\Psi}$ present at the output of the filter 74 may be described by the following approximate equation:

$$\Delta \underline{u}_S^{\hat{\Psi}} \approx \underbrace{\Delta i_S^{\hat{\Psi}} \cdot r_S}_{\text{I}} + \underbrace{\left[-\Delta i_r^{\hat{\Psi}}\right] \cdot r_r}_{\text{II}} + \underbrace{\Delta i_S^{\hat{\Psi}} \cdot l_{\sigma S}}_{\text{III}} + \underbrace{\left[-\Delta i_r^{\hat{\Psi}}\right] \cdot l_{\sigma r}}_{\text{IV}} \quad (6)$$

Figure 1:
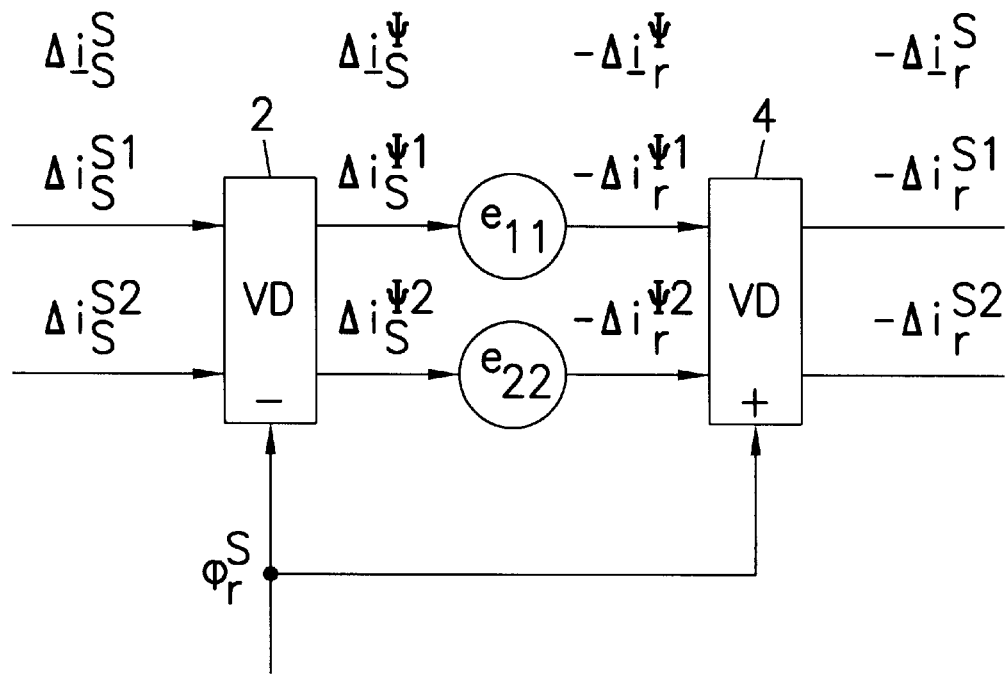
FIG. 1 shows an equivalent circuit of a current transfer element for small, fast movements of the stator current vector.

This approximation is valid, in a corresponding manner to the approximation in FIG. 1, provided the test frequency is sufficiently high; furthermore, the operating frequency $\dot{\Phi}_r^S$ of the flux angle $\Phi_r^S$ to be measured must not exceed certain values. The approximation is thus primarily suitable for the very-low frequency range.

Figure 11:
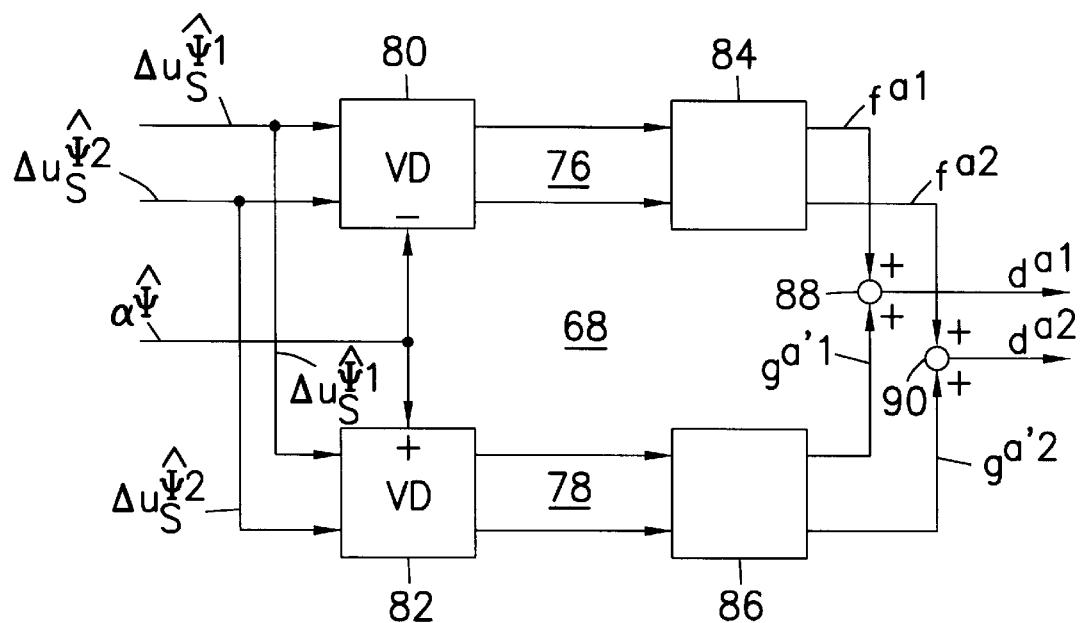
FIG. 11 shows an embodiment of a device according to FIG. 9 for forming the components of a correlation vector.

An embodiment for the device 68 for forming the components $d^{a1}$ and $d^{a2}$ and a correlation vector $d^a$ are illustrated in FIG. 11. According to FIG. 9, this device 68 is connected on the input side to the outputs of the device 62. This device 68 comprises two channels, 76 and 78, for a forward (positive-sequence) system and a reverse system. The two channels 76 and 78 are of identical design. On the input side, the channel 76 or 78, respectively, has a vector rotator 80 or 82, respectively, and a filter 84 or 86, respectively, on the output side, which is connected downstream of the vector rotator 80 or 82, respectively. The outputs of these two channels 76 and 78 are linked to one another component-by-component by means of an addition element 88 or 90, respectively. The components $d^{a1}$ and $d^{a2}$ of the correlation vector $d^a$ are present at the outputs of these two addition elements 88 and 90. The angle inputs of the vector rotators 80 and 82 are linked to an angle output of the integrator 52, at which the position a of the test guide vector a is present.

The voltage vector according to equation (6) has four terms. In detail, these are the resistive and stray-inductance (leakage-inductance) voltage drops of $\Delta i_s^{\Psi}$ and $-\Delta i_r^{\Psi}$. The term which occurs in the basic form appears again, with a proportionality factor, in the term II of equation (6). If the terms I, III and VI tend to zero, the structure of the basic form could be adopted unchanged; this is shown in FIG. 11 by the vector rotator 80 and the filter 84. According to the device of FIG. 11, the vector $f^a$, and in particular, the component $f^{a2}$ is produced. The tendency of the terms I, III and IV in equation (6) towards zero could be achieved by performing a compensating addition to the vector of the stator voltage $u_s$. However, such compensation, which would require knowledge of the corresponding machine parameters, is not carried out in the present configuration; instead, the influence of the terms is rendered ineffective by an extension of the circuit arrangement.

In fact, nothing needs to be done to counteract the term I in equation (6). Specifically, it is evident that the forwardsequence vector of $\Delta i_S$, after its transformation into the coordinate system of the test guide vector a, always gives a horizontally located vector, so that the sum of term I and term II is mapped into the coordinate system of the test guide vector a in the manner shown in FIG. 12. The relevant second coordinate of the result at the output of the filter 84 is thus not changed at all by the component I in equation (6).

Figure 12:
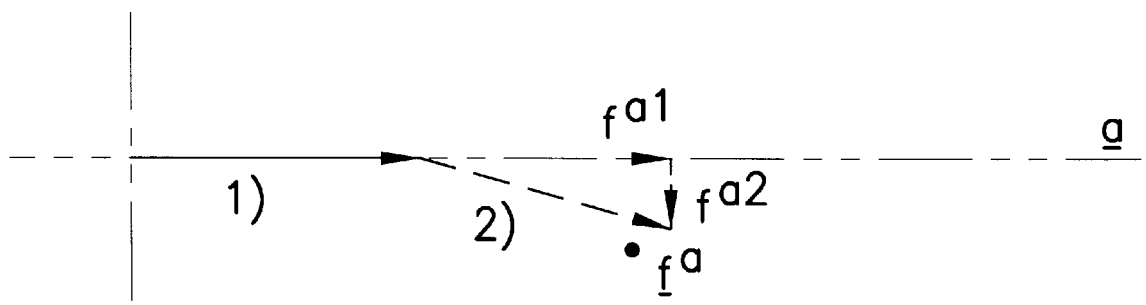
FIG. 12 shows a coordinate system related to a test guide vector to show partial components of the correlation vector.
Figure 2:
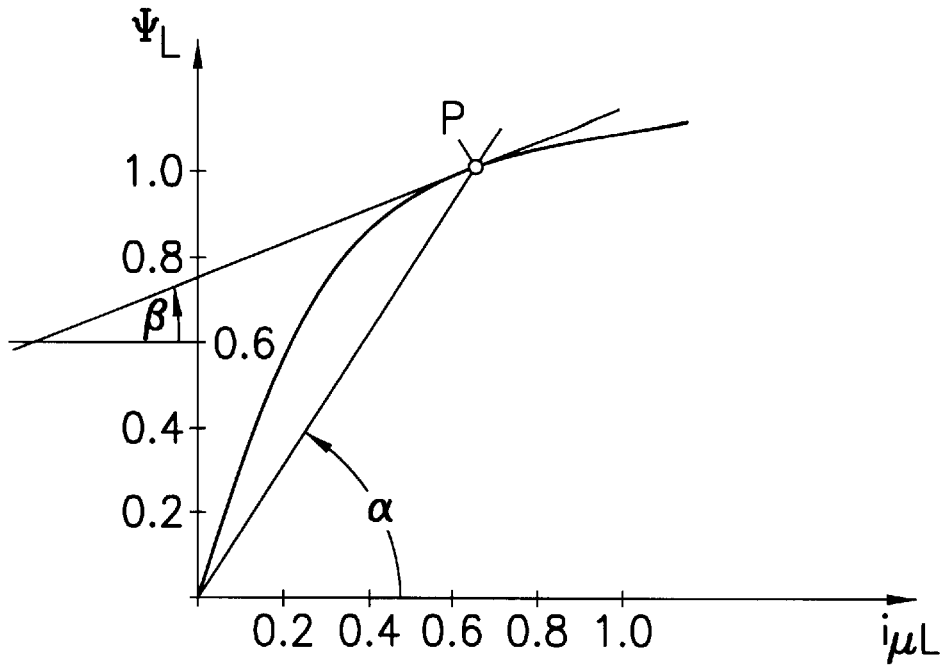
FIG. 2 shows the relationship between the airgap flux and the magnetization current of a rotating-field machine.
Figure 3:
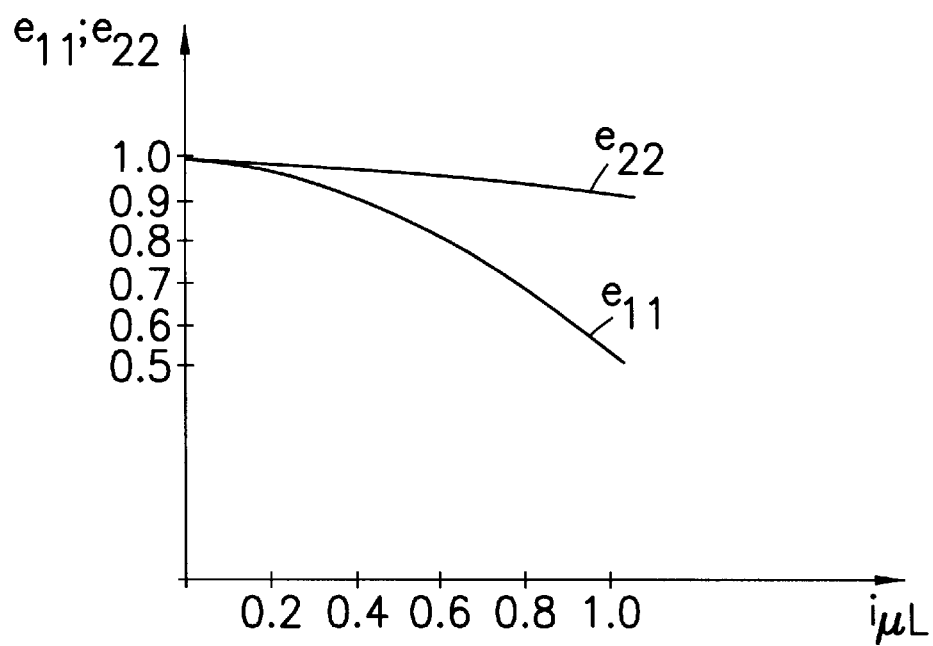
FIG. 3 shows the transformation factors $e_1 1$ and $e_{22}$ for a stray (leakage) inductance of $l_{\sigma r}=0.1$ in a diagram plotted against the magnetization current.
Figure 13:
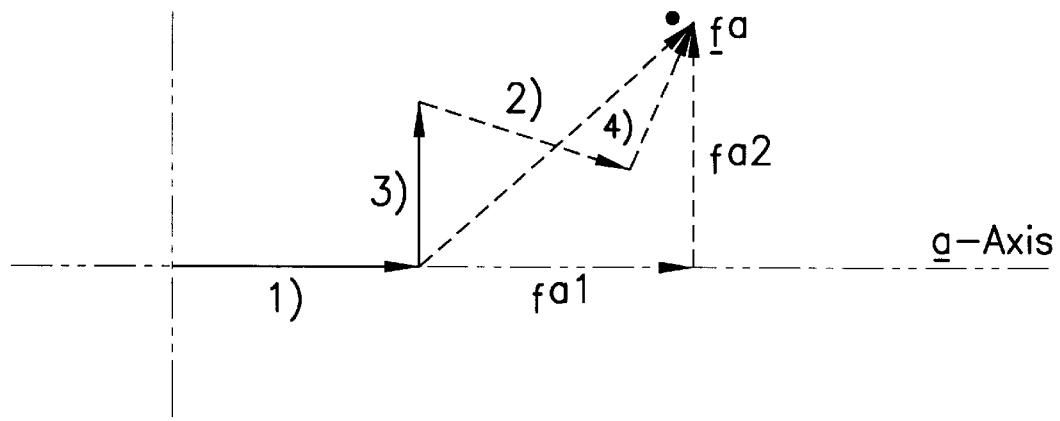
FIG. 13 shows a coordinate system related to the test guide vector to show partial components of the correlation vector.
Figure 14:
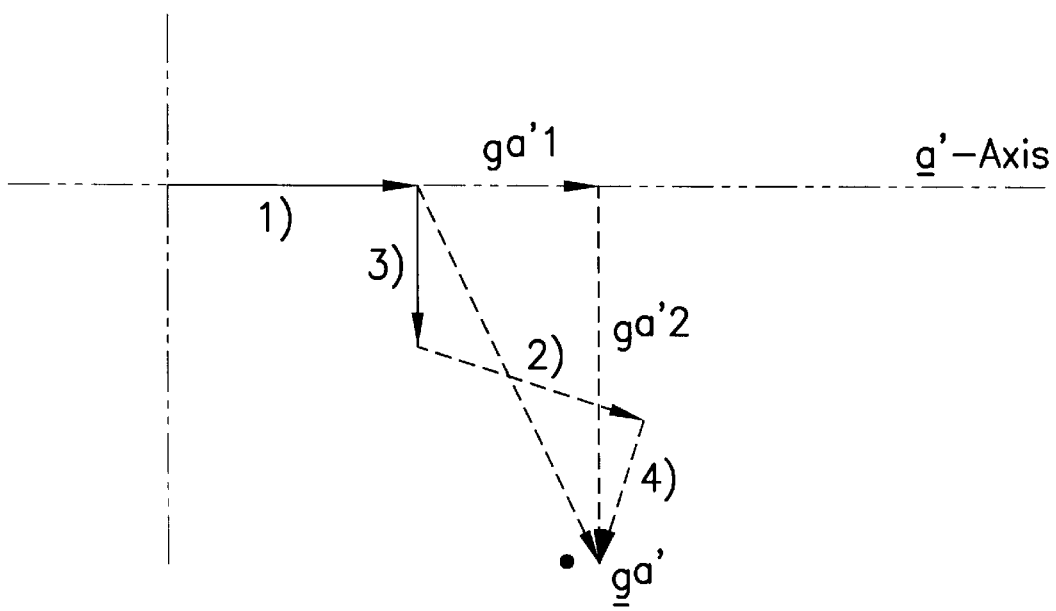
FIG. 14 shows a coordinate system related to the test guide vector to show partial components of the correlation vector.

In contrast, the terms III and IV in equation (6) enormously change the result at the output of the filter 84 since, in addition to the vectors in FIG. 12, there is also in each case one vector perpendicular to the previous one as a result of the inductive stray (leakage) voltages, so that the result is corrupted until it becomes unusable (FIG. 13). However, there is a simple way of avoiding this corruption. Specifically, as is done in FIG. 11 by means of the vector rotator 82 and the filter 86, if the entire voltage vector $\Delta u_S^\Psi$, is additionally transformed into the a'-axis by a test guide vector a', the flux-related mirror-image of the test guide vector a, then the reverse (negative-sequence) system of $\Delta u_S^\Psi$, or its terms I to IV, is thus obtained. It is in this case found that, with this transformation, the resistive elements are mapped in the same manner as is the case in FIG. 13, but the stray-inductance (leakage-inductance) elements extend in the respective other direction, as is illustrated in FIG. 14. The entire vector thus produced is designated $g^{a'}$.

The sum of the vectors $f^a$ and $g^{a'}$ now once again contains only the terms I and II in equation (6), in which each of these terms occur twice, while the terms III and IV in equation (6) are compensated for, as can be seen from FIGS. 13 and 14. Overall, a vector pattern corresponding to FIG. 12, but of twice the size, appears at the sum outputs arranged in FIG. 11. Thus, using the measurement arrangement described here, the flux angle $\phi_r^S$ can be determined at low frequencies and in particular at zero frequency just by using stator voltages (and stator currents for current impression).

For correct operation of the described method, it is necessary to operate the machine in the saturation region. For this reason alone, it is recommended that this mode be used only when absolutely necessary. In addition, the voltage would under some circumstances assume unacceptably high values at relatively high frequencies. The method described here has therefore been called a correction method with the object of supporting or replacing an existing machine model in the lower frequency range. In this context, one may presuppose that a machine model 46 already exists for field orientation of the asynchronous machine 10 illustrated in FIG. 9 and satisfactorily covers a majority of the frequency range, in general. In this context, it appears worthwhile to use the output of the machine model 46 in FIG. 9 as the estimated flux axis $\phi_r^S$ instead of the output of the angle integrator 18 in FIG. 4, and to use the regulator (controller) 34 in FIG. 4 in a suitable manner as a adjusting means for the machine model 46, as soon as this is necessary. The raising of the magnetization current and the switching on of the machine model adjusting means 70, indicated by the switches S2 and S3, is in this case carried out as a function of the frequency $\dot{\phi}_r^S$. The test oscillation via S1 is added at the same time that the switches S2 and S3 are closed.

In the context of equation (6), it has been mentioned that this approximation is sufficiently accurate only when the operating frequencies for the flux to be measured are low. At higher operating frequencies, a rotational stray (leakage) voltage term, which is dependent on the frequency $\dot{\Phi}_r^S$, occurs in addition in each case in equation (6), and this has a disturbing effect even if it is one order of magnitude less. If necessary, these stray (leakages) voltages can be compensated for by applying appropriate currents to the voltage vector $u_S^\Psi$, since the frequency $\dot{\Phi}_r^S$ is actually known.

The described method has been designed and tested for an asynchronous machine 10; however, it also appears suitable for synchronous machines, so long as such machines are each provided with a rotor winding that terminates in a low-impedance manner, irrespective of whether this is a damper winding or a field winding. The reason for having this kind of winding is that the effect on which the method of the present invention is based relates to the current transfer from a primary winding to a low-impedance secondary winding in a rotating-field machine.

Figure 17A:
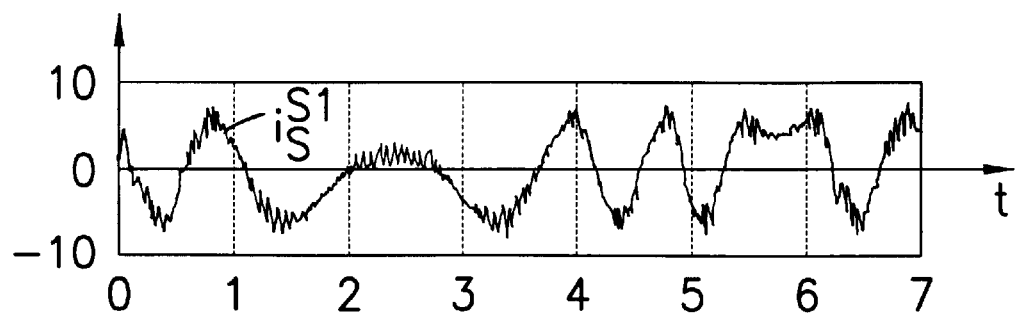
FIG. 17 shows, in each case in a diagram plotted with respect to the time t, the field-forming (field-producing) and torque-forming (torque-producing) stator-related current components, and the electrical torque and the speed in a reversing mode.
Figure 17B:
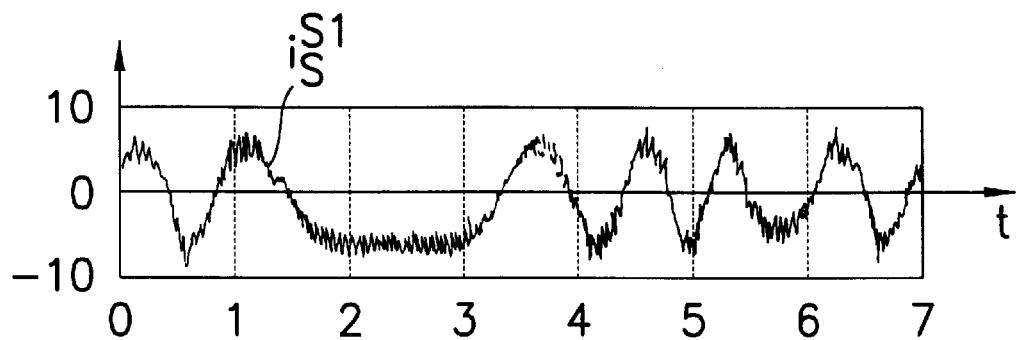
Figure 17C:
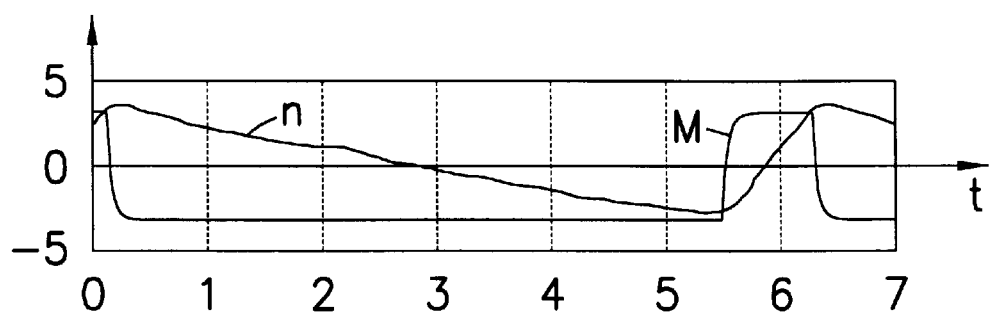
Figure 18A:
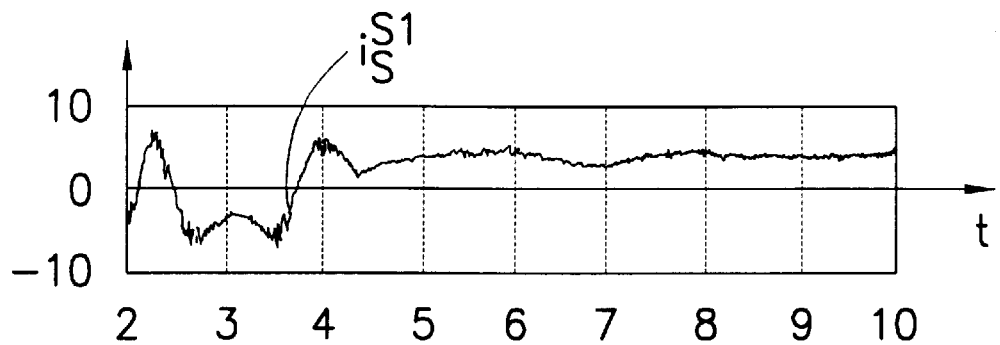
FIG. 18 shows, in each case in a diagram plotted with respect to the time t, the field-forming (field-producing) and torque-forming (torque-producing) stator-related current components, the electrical torque and the speed at zero frequency on load during the transition from the reversing mode to DC operation.
Figure 18B:
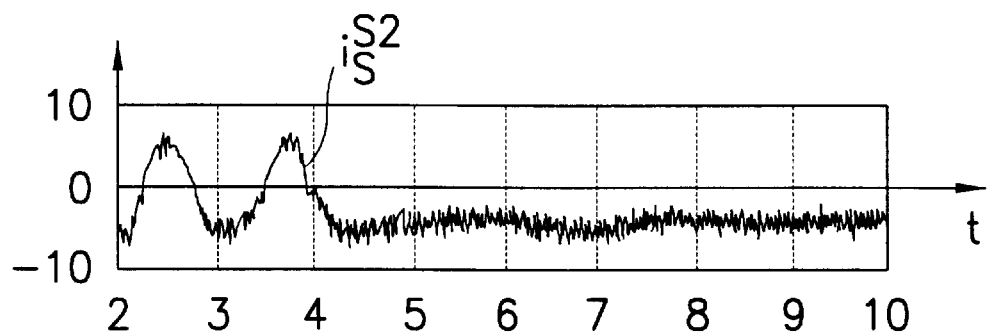
Figure 18C:
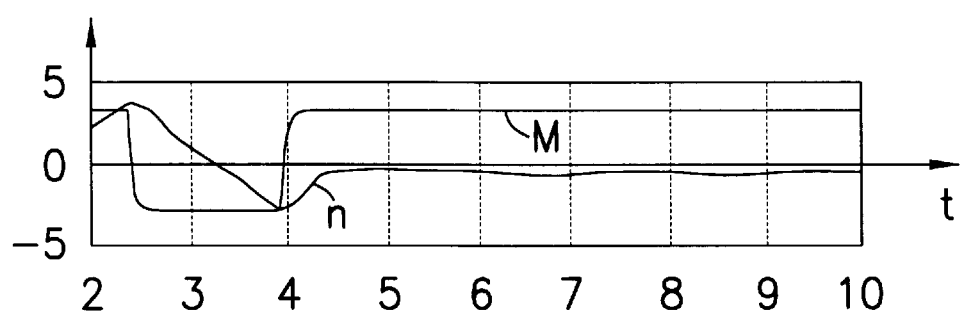
Figure 19A:
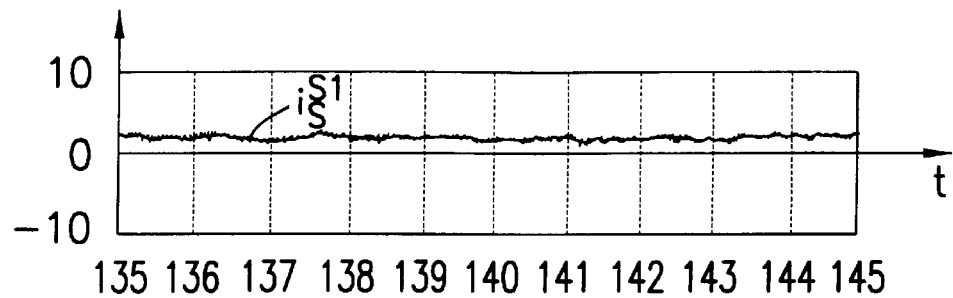
FIG. 19 shows the steady-state DC operation as a continuation of the diagrams in FIG. 18.
Figure 19B:
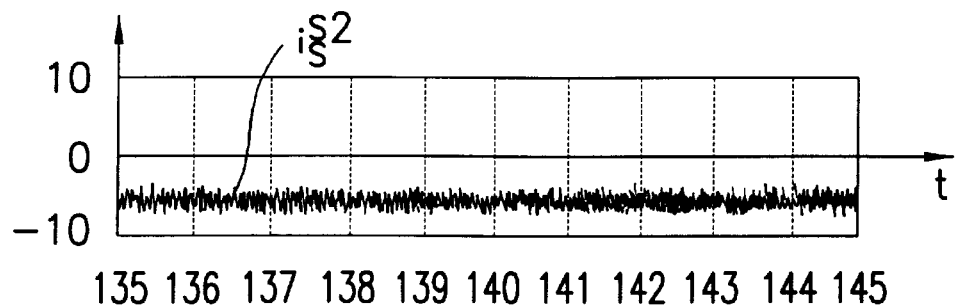
Figure 19C:
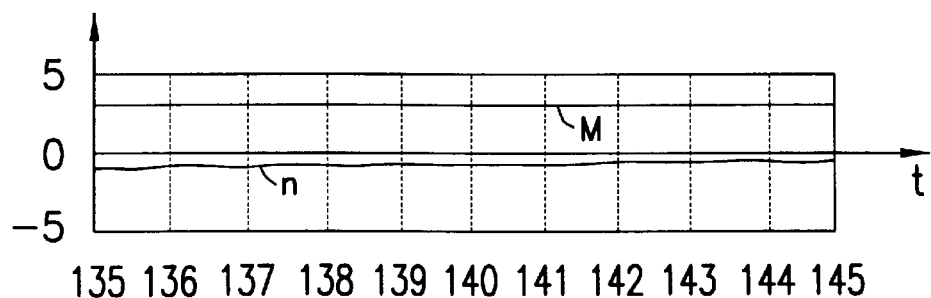

The method was tested on a 25 kW asynchronous machine that was fed from a pulse (e.g., Pulse-Width Modulation) converter and was equipped with hysteresis current controller. FIG. 15 shows the stator current vector is in the rotor flux coordinate system when loaded in the saturation region, to be precise on the left without and on the right with stator current test oscillation. It can be seen from this figure that the stator current test movement, in particular the current actual values, runs parallel to the rotor flux and thus cannot have any influence on the electrical torque. This may be regarded as a positive characteristic of the described method. In FIG. 16, the stator current vector $i_s$ from FIG. 15, on the right of the figure, is illustrated during the test mode, in the stator coordinate system. A frequency of 20 Hz has been found to be sufficiently high as a test frequency in order to avoid any adverse effect on the correctness of the relationships on which the method is based, according to FIG. 1 and equation (6). In order to confirm that the method has operated correctly in the low frequency range, a reversing operation was carried out at +80% of the rated torque between speeds of +3% and −3%. FIG. 17 is in this case based on an accelerating load torque, which greatly delays running up. The torque profile and speed profile can clearly be seen in the lower diagram in this FIG. 17; the time is measured in seconds. The two upper diagrams of this FIG. 17 illustrate the stator winding currents $i_s^{S1}$ and $i_s^{S2}$, including the test oscillation. On-load operation at zero frequency is demonstrated in FIGS. 18 and 19. During a reversing process, a load torque is applied at about t=4.3 and prevents any further acceleration, so that the loaded machine 10 stays at zero frequency. This addition is maintained over a relatively long time in order to demonstrate the stability of such a load. The "zero frequency" state can be seen correctly on the phase direct currents that are now produced and which are illustrated in the two upper diagrams in FIG. 18.

In the past, every machine model has failed at this operating point since, normally, the stator voltage $u_S$ normally contains no information whatsoever about the rotor flux $\Psi_r$ at zero frequency. However, by using the method of the present invention as described herein, flux information is created synthetically to a certain extent at this operating point which, as has been shown, is sufficient for the implementation of correct field-oriented operation.

What is claimed is:

1. A method for correcting a flux direction of a modelled flux vector down to zero frequency, the modelled flux vector being formed by a machine model as a function of a stator current vector and a stator voltage vector of a field-oriented rotating-field machine that includes no sensors, the stator voltage vector including at least one stator voltage component, the method comprising the steps of:

determining a first command value for a field-producing current component of the stator current vector;

determining a second command value for a torque-producing current component of the stator current vector;

adding a current test signal to the first command value, the current test signal exhibiting a non-constant profile with respect to time;

raising the field-producing current component to operate the rotating-field machine in a saturation region;

detecting a profile with respect to time of each stator voltage component;

converting the profile of each stator voltage component into a corresponding flux-oriented voltage component;

deriving from each corresponding flux-oriented voltage component a corresponding voltage component having a non-constant profile with respect to time;

deriving a variable from the current test signal;

determining at least a first component and a second component of a correlation vector from a profile with respect to time of the derived variable and from the profile with respect to time of each corresponding voltage component, wherein the first component represents a value of the correlation vector along a first axis, and the second component is perpendicular to the first axis; and adjusting the flux direction of the simulated modelled flux vector to the second determined component of the correlation vector until the second component becomes zero.

2. The method according to claim 1, wherein the current test signal includes a cosine oscillation in the form $$[\Delta i_S]_T = a \cdot \cos \dot{\alpha}^\Psi t.$$

3. The method according to claim 1, wherein the step of determining at least the first component and the second component of the correlation vector includes the steps of:

providing a first test guide vector and a second test guide vector, wherein the first test guide vector is arranged at least along the first axis, and the second test guide vector is arranged at least along a second axis;

transforming each corresponding voltage component into the first axis of the first test guide vector and the second axis of the second test guide vector reflected onto the flux direction of the modelled flux vector;

generating a first transformation vector having at least one component that is perpendicular to the first axis;

generating a second transformation vector having at least one component that is at right angles to the second axis; and forming the second component of the correlation vector by adding together the at least one component of the first transformation vector that is at right angles to the first axis and the at least one component of the second transformation vector that is at right angles to the second axis.

4. An apparatus for correcting a flux direction of a modelled flux vector down to zero frequency, the modelled flux vector being formed by a machine model as a function of a stator current vector and a stator voltage vector of a field-oriented rotating-field machine that includes no sensors, the apparatus comprising:

a control element for a stator current of the rotating-field machine;

a machine model including a plurality of inputs for receiving stator voltage components of the stator current vector and stator current components of the stator voltage vector;

a control device, in communication with the control element, the control device including a plurality of inputs for receiving a first nominal value for a flux-producing current component of the stator current vector and a second command value for a torque-producing current component of the stator current vector;

a generator, in communication with the control device, for producing a current test signal having a non-constant profile with respect to time;

a current raising device, in communication with the control device, for raising the command value of the flux-producing current component;

a voltage component producing device, in communication with the control device, for producing at least one voltage component, each of the at least one voltage component having a non-constant profile with respect to time;

a coordinate converter, in communication with the voltage component producing device, for receiving stator voltages of the rotating-field machine; and a correlation vector device, in communication with the voltage component producing device, for forming a correlation vector having a first component arranged along a first axis and a second component that is perpendicular to the first axis, the correlation vector device including a first output for supplying the first component of the correlation vector, and a second output for supplying the second component of the correlation vector, and the second output of the correlation vector device being coupled via an adjusting means to the machine model.

5. The apparatus according to claim 4, wherein the current raising device includes:

a device for performing a voltage dividing operation;

an addition element; and a switch having an input in communication with an output of the device for performing the voltage dividing operation and having an output in communication with the addition element.

6. The apparatus according to claim 4, wherein the generator includes:

an angle integrator;

a vector rotator having an angle input in communication with an output of the angle integrator;

a first voltage division device having an output in communication with the angle integrator;

a second voltage division device having an output in communication with a signal input of the vector rotator, wherein the vector rotator has another input coupled to ground.

7. The apparatus according to claim 4, wherein the voltage component producing device includes a vector rotator connected in series to a filter.

8. The apparatus according to claim 4, wherein the correlation vector device includes:

a first series circuit including a first vector rotator, and a first filter connected in series to the first vector rotator;

a second series circuit coupled to the first series circuit including a second vector rotator, and a second filter connected in series to the second vector rotator;

a first adder having an input for receiving a first output of the first filter and an input for receiving a first output of the second filter, an output of the first adder corresponding to the first output of the correlation vector device; and a second adder having an input for receiving a second output of the first filter and an input for receiving a second output of the second filter, an output of the second adder corresponding to the second output of the correlation vector device.

9. The apparatus according to claim 4, wherein the voltage component producing device, the correlation vector device, the adjusting means, and the machine model are integrated into a physical unit.

10. The apparatus according to claim 9, wherein the physical unit comprises a microprocessor.

* * * * *